United States Patent [19]

Hein et al.

[11] Patent Number: 5,782,462
[45] Date of Patent: Jul. 21, 1998

[54] HYDRAULICALLY DAMPED POWERTRAIN MOUNT

[75] Inventors: Richard D. Hein. Wabash; Paul T. Wolfe; Douglas M. McLelland. both of Ft. Wayne. all of Ind.

[73] Assignee: BTR Antivibration Systems, Inc.. Fort Wayne. Ind.

[21] Appl. No.: 902,489

[22] Filed: Jul. 29, 1997

Related U.S. Application Data

[63] Continuation of Ser. No. 546,462, Oct. 20, 1995, abandoned.
[51] Int. Cl.$^6$ .................................................. F16F 13/00
[52] U.S. Cl. ................. 267/140.13; 267/219; 267/140.3; 267/140.5
[58] Field of Search .................... 267/35. 140.11. 267/140.13. 140.3. 141. 141.1. 141.3. 141.4. 219. 140.5; 180/300. 312. 902; 248/550. 636. 638. 562. 566

[56] References Cited

U.S. PATENT DOCUMENTS

| | | | |
|---|---|---|---|
| 4,240,517 | 12/1980 | Harlow, Jr. et al. | 180/295 |
| 4,399,987 | 8/1983 | Cucelli et al. | 267/140 |
| 4,679,777 | 7/1987 | Gold et al. | 267/140.13 |
| 4,681,306 | 7/1987 | Hofmann et al. | 267/140 |
| 4,741,521 | 5/1988 | Schiffner et al. | 267/140 |
| 4,757,982 | 7/1988 | Andräet al. | 267/219 |
| 4,773,634 | 9/1988 | Hamaekers | 267/219 |
| 4,875,664 | 10/1989 | Moore | 267/218 X |
| 4,903,951 | 2/1990 | Miyamoto et al. | 267/140 |
| 4,997,169 | 3/1991 | Nakamura et al. | 267/140 |
| 5,050,702 | 9/1991 | Sauer | 180/300 |
| 5,269,498 | 12/1993 | Bretaudeau et al. | 267/140.13 |
| 5,316,275 | 5/1994 | Maeno et al. | 267/140.13 |

FOREIGN PATENT DOCUMENTS

| | | | |
|---|---|---|---|
| 0044545 | 7/1981 | European Pat. Off. . | |
| 0132404 | 7/1984 | European Pat. Off. . | |
| 442763 | 8/1991 | European Pat. Off. | 267/140.12 |
| 4036517 | 5/1992 | Germany | 267/140.13 |
| 1312130 | 8/1970 | United Kingdom . | |

OTHER PUBLICATIONS

SAE The Engineering Resource For Advancing Mobility. SAE Technical Paper Series 840407. Hydraulic Engine Mount Characteristics. Patrick E. Corcoran. Gerd–Heinz Ticks. pp. 29–34.

Understanding Hydraulic Mounts for Improved Vehicle Noise, Vibration and Ride Qualities. Series 850975. Wallace C. Flower. pp. 123–128.

Primary Examiner—Douglas C. Butler
Attorney, Agent, or Firm—Wood. Herron & Evans

[57] ABSTRACT

The present invention relates to a hydraulically damped powertrain mount (10) which includes an inner and outer in-series elastomeric springs (12. 14). having a cylindrical form with an oval cross section. The powertrain mount is secured to a supporting object by a flange extending outwardly from the periphery of an outer support housing (18) conforming generally to the shape of the outer elastomeric spring. Adjoining the inner and outer springs is a intermediate metal plate (16) utilized to assemble the springs concentrically in a partially nested relation therewith. A mounting member (22) is received within a centrally located recess portion formed in the inner spring and projects freely from the inner spring for attaching the engine or motor which is to be supported. A diaphragm (32) is secured to the intermediate metal plate and cooperates with the inner spring to define a fluid filled chamber. The fluid chamber is divided by a partition assembly (28) into two fluid filled holding chambers (A, B). The holding chambers communicate with one another through a fluid track (40) within the partition assembly. Fitted within the partition assembly is a decoupler (38) for controlling fluid flow between the fluid-filled chambers.

9 Claims, 1 Drawing Sheet

HYDRAULICALLY DAMPED POWERTRAIN MOUNT

This application is a continuation of Ser. No. 08/546,462 filed Oct. 20, 1995, now abandoned.

FIELD OF THE INVENTION

This invention relates to an in-series hydro elastomeric spring for use in mounting a powertrain to a vehicle body or chassis.

BACKGROUND OF THE INVENTION

An automobile engine is subject to complex vibration effects which produce multiple degrees of motion and combinations of same. For insulating the automobile structure from engine vibrations as well as minimizing unwanted movements of the engine under all running conditions, a resilient anti-vibration system is required, so that the vibratory forces are reduced to the relatively small spring forces transmitted by the support mountings themselves.

As applied to engine mounting systems, the engine support mounts almost invariably feature rubber as their spring medium, since this material is highly resilient by virtue of its high ratio of deflection to load. The use of rubber also confers an inherent self-damping effect on the spring action of the mounts, which is beneficial in preventing resonant vibration.

Fluid powertrain mounts have been incorporated in a typical automotive engine mount systems to reduce interior noise and vibration levels, and improve ride, especially on moderate to rough roads. The liquid filled mount generally contains two separate chambers for fluid transfer, with an orifice to control damping. The top chamber is bounded on one side by the primary rubber element, and on the other by the orifice plate. The bottom chamber is bounded by a secondary rubber element on one side and the orifice plate on the other. The primary rubber element has two functions, first to carry the static and dynamic load on the mount and, secondly, to act as a piston to pump the liquid through the orifice into the bottom chamber. At idle, with low-amplitude engine movements, fluid is free to move between the chambers through a fluid transfer valve. High-amplitude engine movements, such as those found at road speed, put pressure on the fluid transfer valve, closing it and forcing the hydraulic fluid through passages in the orifice plate into the lower chamber. Fluid movement through the restricted orifices causes a damping effect, absorbing higher-amplitude movements.

In practice, the engine is often elastomerically supported at three points on a rigid cradle or subframe to which the drive-wheel suspension control arms are swingably connected. A plurality of cushion mounts support the cradle to the vehicle body. This mounting system relieves the engine unit of strain due to chassis deflection and absorbs torque fluctuations, produced by engine vibration, more effectively by virtue of greater mounting flexibility.

Prior cushion mounting arrangements, including those with a cushion mounted subframe and the powertrain cushion mounted thereon, provide desirable damping characteristics. U.S. Pat. No. 4,240,517, the disclosure of which is incorporated by reference herein, is typical of the patents that use a cushion mounted subframe or cradle to support the powertrain. Such series arrangements however, are difficult to assemble and to manufacture, comprise numerous parts, and increase the overall weight and costs of the vehicle. Accordingly, a need exists for a light weight, cost effective mounting device which can substantially absorb vibratory forces while securely mounting the engine to the vehicle body or chassis.

BRIEF SUMMARY OF THE INVENTION

It is therefore an object of the present invention to provide an in-series hydraulically damped elastic engine mount which is lighter in weight and simpler in construction than prior cushion mounting arrangements. The fluid damped in-series mount of the preferred embodiment of the present invention eliminates the need for a cushion mounted rigid cradle or subframe of the prior art powertrain mounting arrangement by replacing the cushion mounted cradle with a plurality of in-series hydraulic mounts directly supporting the weight of the powertrain on the vehicle body or chassis. With such series arrangement of the cradle mount and the powertrain mount, an effective vibration control is provided between the vehicle body and the powertrain so as to more efficiently isolate vibrations over the entire range of vehicle operation and road conditions.

More particularly in accordance with the preferred embodiment of the present invention, the mount is provided with an inner shock-absorbing hydraulically damped elastomeric element, fixed to a powertrain mounting point. The inner elastomeric element is integrated with an outer in-series elastomeric mount, the outer elastomeric mount having a body-side bracket for directly supporting the powertrain at mounting points on a vehicle body.

For a further understanding of the present invention and the objects thereof, attention is directed to the drawing and the following brief description thereof, to the detailed description of the preferred embodiment and to the appended claims.

BRIEF DESCRIPTION OF THE DRAWINGS

The above and optional objects, features and advantages of the present invention will become more apparent by reading the following detailed description when considered in conjunction with the accompanying drawings, in which.

DESCRIPTION OF THE PREFERRED EMBODIMENTS

Figure 1:
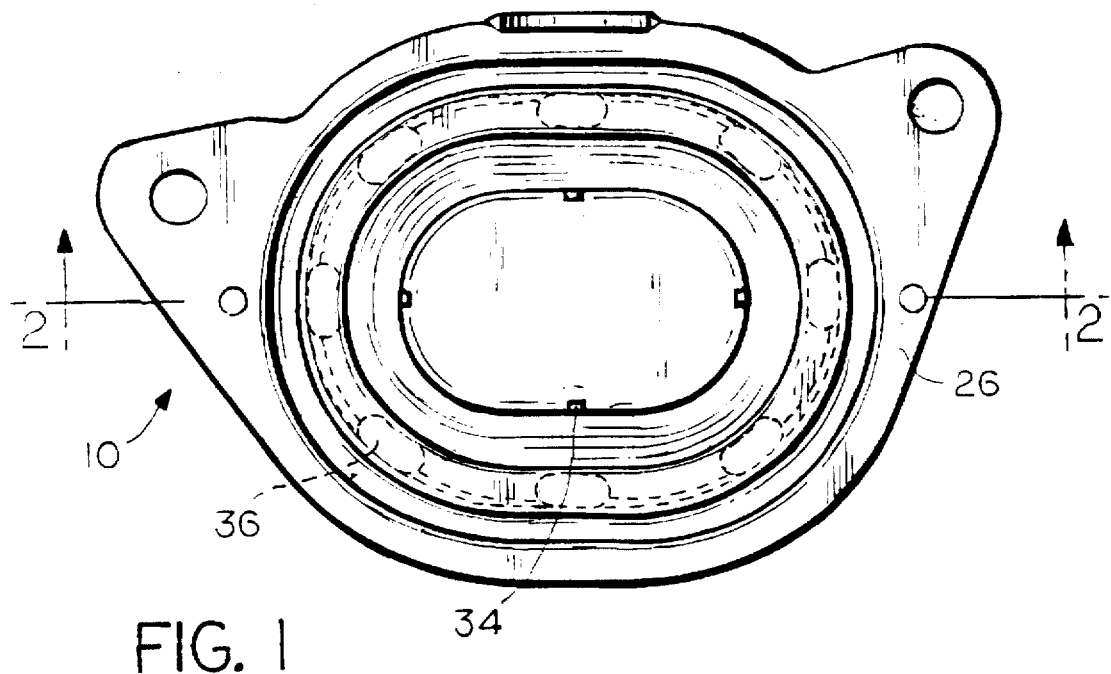
FIG. 1 is a top view of the referred embodiment of a powertrain mount according to the present invention.
Figure 2:
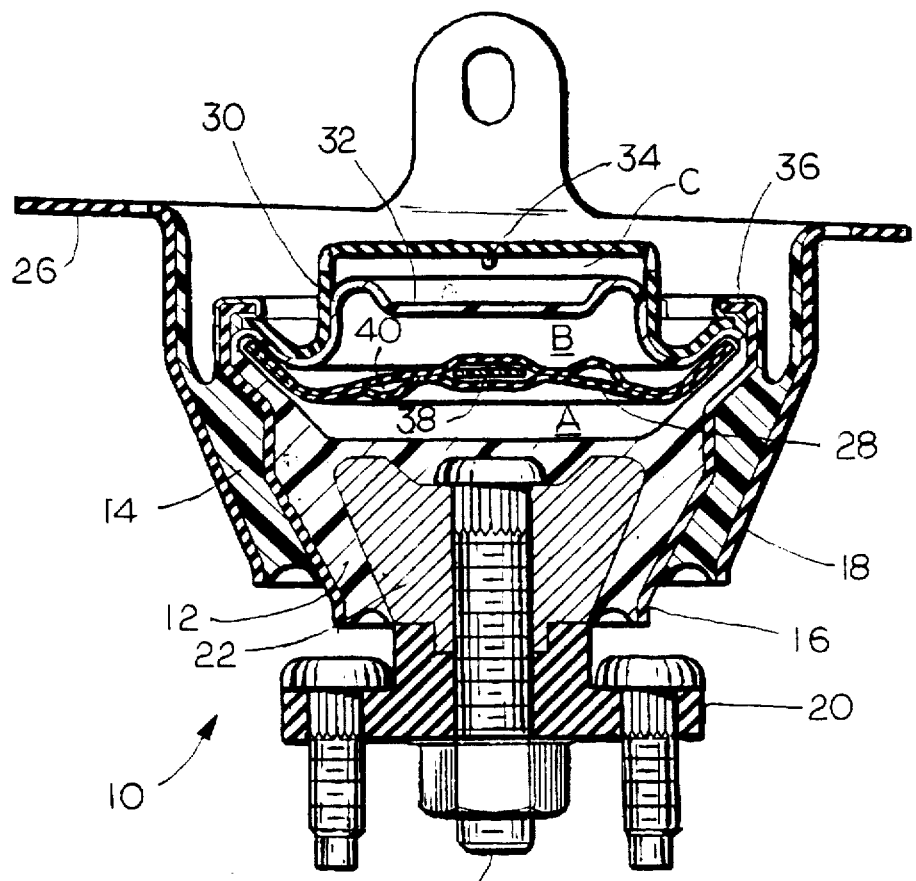
FIG. 2 is a front cross-sectional view, taken along line 2—2 of FIG. 1.

A powertrain mount according to the preferred embodiment of the present invention is identified generally by reference numeral 10 in FIGS. 1 and 2. The mount 10 is comprised of an inner hydro-elastomeric spring 12 and an outer elastomeric spring 14 positioned in series with one another. An intermediate metal sleeve 16 is disposed between the two in-series springs 12 and 14 and is fixably connected thereto by way of vulcanizing or the like. An outer support housing 18 is bonded by vulcanization, or the like, to the outer periphery surface of the outer spring 14.

The engine mount 10 including the springs 12 and 14 is in the form of a truncated elliptical cone. Furthermore, the dynamic spring characteristic of the elastomeric springs 12 and 14 can be modified in accordance with the needs of the particular vehicle suspension application and operating conditions.

Various parameters of the engine mount 10 are selected to approximately meet the equation:

$$K_{D\,Unit} = \cfrac{1}{\cfrac{1}{K_{D\,Hydro/Elast}} + \cfrac{1}{K_{D\,Elast}}}$$

Where $K_{D\,Unit}$ is the dynamic spring rate of the entire engine mount 10, $K_{D\,Hydro/Elast}$ is the dynamic spring constant of the inner hydro-elastomeric spring 12, and $K_{D\,Elast}$ is the dynamic spring constant of the outer elastomeric spring 14.

The inner spring 12 can be fastened to a non-illustrated engine or motor by mounting bolts extending through the upper end surface of an optional support plate 20. The support plate 20 is connected to a mounting member 22 by means of a bolt 24 extending thereto. The support housing 18 can be fastened through the support flange 26, adapted to receive connecting bolts or studs, to an unillustrated vehicle body or chassis. With this connection arrangement the inner spring 12 supports the engine while the outer spring 14 functions to support the entire engine mount to the vehicle chassis.

As best seen in FIG. 2, the inner spring 12 is also formed with a plurality of fluid-filled chambers which extend essentially parallel with the axis of the bolt 24. The first fluid-filled chamber A is defined by the interior surface of the spring 12 and a partition assembly 28. A second fluid-filled chamber B is interconnected to the first fluid-filled chamber A through a fluid track 40 in the partition assembly 28 and bordered by a housing cover 30. The second fluid-filled chamber B acts as an expansion chamber into which fluid from the first fluid-filled chamber A can be displaced.

The fluid within the chambers are forced to flow therebetween through the fluid track 40 in the partition assembly 28 based on relative volume changes in the fluid chambers as a result of vibrational displacement of the spring 12.

The second fluid-filled chamber B and housing cover also includes a flexible elastomeric diaphragm 32 sealed against the periphery of the partition assembly 28 by tabs 36 extending from the intermediate metal sleeve 16. The flexible diaphragm 32 partitions off a portion of the second fluid-filled chamber B and defines a first air chamber C between itself and the housing cover 30. The air chamber C is connected to a atmosphere via a plurality of openings 34 in the periphery of the housing cover 30.

As also seen in FIG. 2, a decoupler 38 can be mounted between the fluid-filled chambers A, B. The decoupler 38, which can be made of a suitable plastic material if desired, is movably mounted within the partition assembly 28 for controlling fluid flow against the flexible diaphragm 32 within the fluid-filled chambers A, B.

When the vehicle suspension system generates high amplitude vibrations, the decoupler 38 compensates for the displacement of the elastomeric spring 12 and the variations in the volume of the first and second fluid-filled chambers A and B so that there is a substantially limited transfer of liquid beyond the partition assembly 28. In other words, when the elastomeric spring 12 deforms to such an extent that it creates a high pressure surge within the fluid-filled chambers, the decoupler 38 contacts either the upper or the lower surface of the partition assembly 28, deflecting the amount of fluid that can be induced to resonate back and forth through the partition assembly 28 that in-turn greatly stiffens the dampening characteristics of the inner elastomeric spring 12. At this time the vibrations of the engine are absorbed by the inherent dynamic spring constants of the in-series elastomeric springs 12 and 14.

When in contrast, the elastomeric spring 12 experiences low amplitude vibrations then the variation in volume of the first and second fluid-filled chambers A and B does not force the decoupler 38 against the upper or lower surface of the partition assembly 28. In this case, the fluid flow is not prevented from deflecting the flexible diaphragm 32 and hence reduces the chamber stiffness of the suspension mount 10.

Further variations and modification which can be made to the above type of suspension mount will be apparent in view of the forgoing disclosure.

What is claimed is:

1. An in-series hydraulically damped powertrain mount comprising:

(a) a mounting element adapted to be fixed to a movable body;

(b) a first resilient member having an inner surface coaxially connected to one end of said mounting element and an outer surface fixed to a support member;

(c) a deformable element cooperating with said inner surface of said first resilient member so as to define a fluid damping assembly for damping oscillations of said mounting element with respect to said support member, said fluid damping assembly divided into upper and lower fluid chambers;

(d) a partition member disposed between said upper and lower fluid chambers and having a passage to allow communication between said fluid chambers;

(e) an attachment member adapted to be fixed to a stationary component; and (f) a second resilient member fixed between said support member and said attachment member for damping oscillation of said first resilient member with respect to the stationary component;

wherein each of said first resilient member, said second resilient member, said support member and said attachment member is in the form of a truncated elliptical cone.

2. An in-series hydraulically damped powertrain mount according to claim 1, and further comprising a plate movably mounted within said partition member and perpendicular to the axis of said mount for controlling fluid flow to a varying extent depending upon the position of said plate.

3. An in-series hydraulically damped powertrain mount for absorbing vibrations from a vibration source, comprising:

(a) a first resilient member adapted to be attached to the vibration source, said first resilient member having a cavity opposite the vibration source in which a fluid is enclosed;

(b) a partition assembly dividing said cavity into a first chamber and second chamber, said partition assembly having a limiting passage channel to connect said first chamber and said second chamber thereby allowing communication between said first and second chamber resulting from a change in volume of said chambers during deformation of said first resilient member; and (c) a second resilient member connected to said first resilient member, said second resilient member being disposed in-series with said first resilient member for supporting said first resilient member to a vibration receiving source; and said powertrain mount having a dynamic spring rate which is approximately described by the equation $$K_{D\,Unit} = \cfrac{1}{\cfrac{1}{K_{D\,Hydro/Elast}} + \cfrac{1}{K_{D\,Elast}}};$$

where $K_D$ Unit is the dynamic spring rate of the entire powertrain mount, $K_D$ Hydro/Elast is the dynamic spring rate of the first resilient member and $K_D$ Elast is the dynamic spring rate of the second resilient member.

4. An in-series hydraulically damped powertrain mount according to claim 3, and further comprising a housing, said housing and said partition assembly together defining said second chamber.

5. An in-series hydraulically damped powertrain mount according to claim 4, and further comprising an elastic membrane partitioning said second chamber to define an air chamber between said housing and said membrane, said membrane being adapted to be deformed during volume changes within said second chamber.

6. An in-series hydraulically damped powertrain mount according to claim 3, and further comprising a plate movably mounted perpendicular to the axis of said mount for controlling fluid flow through said limiting passage channel to a varying extent depending upon the position of said plate.

7. An in-series hydraulically damped powertrain mount for directly supporting a vehicle powertrain on a vehicle chassis and without a cradle or subframe between the vehicle powertrain and chassis, said powertrain mount comprising:

a mounting member adapted to have mounted thereto the powertrain;

a first resilient member having inner and outer surfaces, said inner surface being coaxially connected to said mounting member;

a deformable element cooperating with said inner surface of said first resilient member to define a fluid damping assembly having upper and lower fluid chambers;

a partition member disposed between said upper and lower fluid chambers and having a passage to allow fluid communication between said chambers;

a second resilient member having inner and outer surfaces;

an intermediate member disposed between said first and second resilient members, said outer surface of said first resilient member and said inner surface of said second resilient member being connected to said intermediate member; and a support member adapted to be mounted to the chassis, said outer surface of said second resilient member being connected to said support member;

said first and second resilient members thereby being connected in series.

8. The powertrain mount of claim 7 further including a plate movably mounted within said partition member and perpendicular to a longitudinal axis of said mount for controlling fluid flow between said chambers depending upon the position of said plate, said plate serving to decouple said fluid damping assembly during periods of high amplitude vibration of the powertrain.

9. The powertrain mount of claim 7 wherein each of said first resilient member, second resilient member, intermediate member and support member is in the form of a truncated elliptical cone.

* * * * *